United States Patent
Agarwal et al.

(10) Patent No.: US 10,034,144 B2
(45) Date of Patent: Jul. 24, 2018

(54) APPLICATION AND SITUATION-AWARE COMMUNITY SENSING

(71) Applicant: International Business Machines Corporation, Armonk, NY (US)

(72) Inventors: Vikas Agarwal, Bangalore (IN); Nilanjan Banerjee, Bangalore (IN); Dipanjan Chakraborty, Bangalore (IN); Sumit Mittal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 13/774,000

(22) Filed: Feb. 22, 2013

(65) Prior Publication Data
US 2014/0245307 A1 Aug. 28, 2014

(51) Int. Cl.
| | | |
|---|---|---|
| *H04W 4/38* | (2018.01) | |
| *H04W 4/02* | (2018.01) | |
| *H04W 4/04* | (2009.01) | |
| *G06Q 50/00* | (2012.01) | |
| *G06Q 10/10* | (2012.01) | |
| *H04L 29/08* | (2006.01) | |
| *G06Q 30/02* | (2012.01) | |
| *G06Q 50/10* | (2012.01) | |

(52) U.S. Cl.
CPC .......... *H04W 4/043* (2013.01); *G06Q 10/101* (2013.01); *G06Q 30/02* (2013.01); *G06Q 50/01* (2013.01); *G06Q 50/10* (2013.01); *H04L 67/12* (2013.01); *H04W 4/38* (2018.02)

(58) Field of Classification Search
CPC ...... G01D 11/00; G06F 9/4881; G06F 9/4406
USPC ........................................................ 709/202
See application file for complete search history.

(56) References Cited

U.S. PATENT DOCUMENTS

| | | | |
|---|---|---|---|
| 7,020,701 B1 * | 3/2006 | Gelvin .................. | G01D 21/00 250/332 |
| 8,271,234 B1 * | 9/2012 | Cunningham ........... | F41H 1/00 702/188 |
| 8,334,898 B1 * | 12/2012 | Ryan et al. ..................... | 348/61 |

(Continued)

OTHER PUBLICATIONS

Stan Musick, Keith Kastella; Comparison of Sensor Management Strategies for Detection and Classification; Mar. 1996; Avionics Directorate Wright Laboratory Air Force Materiel Command Wright Patterson AFB OH 45433-7623.*

(Continued)

*Primary Examiner* — Kevin Bates
*Assistant Examiner* — Mark A Scott
(74) *Attorney, Agent, or Firm* — Ryan, Mason & Lewis, LLP

(57) ABSTRACT

Techniques, systems, and articles of manufacture for application and situation-aware community sensing. A method includes processing one or more sensor data requirements for each of multiple sensing applications and one or more user preferences for sensing, determining a sensing strategy for multiple sensors corresponding to the multiple sensing applications based on the one or more sensor data requirements and the one or more user preferences for sensing, wherein said sensing strategy comprises logic for executing a sensing task, and scheduling a sensor duty cycle and a sampling frequency for each of the multiple sensors based on the sensing strategy needed to execute the sensing task.

16 Claims, 7 Drawing Sheets

(56) References Cited

U.S. PATENT DOCUMENTS

| | | | | |
|---|---|---|---|---|
| 9,215,560 B1* | 12/2015 | Jernigan | | H04W 4/021 |
| 9,501,613 B1* | 11/2016 | Hanson | | G06F 19/00 |
| 9,692,611 B1* | 6/2017 | Tom | | H04L 12/2697 |
| 2004/0128091 A1* | 7/2004 | Delin | | G01D 21/00 |
| | | | | 702/75 |
| 2004/0143602 A1* | 7/2004 | Ruiz | | H04N 7/181 |
| 2005/0222895 A1* | 10/2005 | Jakobson | | G06Q 10/06 |
| | | | | 705/7.11 |
| 2005/0228763 A1* | 10/2005 | Lewis | | G06Q 10/06 |
| | | | | 706/1 |
| 2006/0270421 A1* | 11/2006 | Phillips | | G08B 21/0236 |
| | | | | 455/457 |
| 2007/0070069 A1* | 3/2007 | Samarasekera | | G06F 3/011 |
| | | | | 345/427 |
| 2007/0291118 A1* | 12/2007 | Shu | | H04N 7/18 |
| | | | | 348/156 |
| 2007/0294360 A1* | 12/2007 | Ebling | | A61B 5/14532 |
| | | | | 709/208 |
| 2008/0222246 A1* | 9/2008 | Ebling | | A61B 5/14532 |
| | | | | 709/203 |
| 2008/0320128 A1* | 12/2008 | Bou-Diab | | G06F 17/30312 |
| | | | | 709/224 |
| 2009/0006295 A1* | 1/2009 | Angell | | G06K 9/00335 |
| | | | | 706/21 |
| 2009/0089108 A1* | 4/2009 | Angell | | G06Q 10/0635 |
| | | | | 705/7.28 |
| 2009/0144577 A1* | 6/2009 | Sarker | | G06F 1/3225 |
| | | | | 713/340 |
| 2009/0208054 A1* | 8/2009 | Angell | | G06K 9/00771 |
| | | | | 382/103 |
| 2009/0240695 A1* | 9/2009 | Angell | | G06F 17/30781 |
| 2010/0076714 A1* | 3/2010 | Discenzo | | H02N 2/181 |
| | | | | 702/104 |
| 2010/0125476 A1* | 5/2010 | Yeom | | G06Q 10/067 |
| | | | | 717/104 |
| 2010/0290395 A1* | 11/2010 | Sexton et al. | | 370/328 |
| 2011/0143811 A1* | 6/2011 | Rodriguez | | G06K 9/00986 |
| | | | | 455/556.1 |
| 2011/0231355 A1* | 9/2011 | Lee | | G06N 5/046 |
| | | | | 706/46 |
| 2011/0238379 A1* | 9/2011 | Misra | | G06F 19/3418 |
| | | | | 702/187 |
| 2011/0238751 A1* | 9/2011 | Belimpasakis | | G06F 3/011 |
| | | | | 709/204 |
| 2011/0320119 A1* | 12/2011 | Jerez Morales | | G01C 21/20 |
| | | | | 701/516 |
| 2012/0026938 A1* | 2/2012 | Pandey | | H04L 43/065 |
| | | | | 370/328 |
| 2012/0095622 A1* | 4/2012 | Lynch | | B64C 25/00 |
| | | | | 701/3 |
| 2012/0101912 A1* | 4/2012 | Sen | | H04L 67/12 |
| | | | | 705/26.3 |
| 2012/0106738 A1* | 5/2012 | Belenkiy | | H04L 9/0872 |
| | | | | 380/270 |
| 2012/0110602 A1 | 5/2012 | Sanders | | |
| 2012/0179742 A1* | 7/2012 | Acharya | | H04N 7/18 |
| | | | | 709/202 |
| 2012/0188940 A1* | 7/2012 | Agrawal | | H04W 4/185 |
| | | | | 370/328 |
| 2012/0191706 A1* | 7/2012 | Song et al. | | 707/736 |
| 2012/0203491 A1* | 8/2012 | Sun | | A61B 5/0006 |
| | | | | 702/108 |
| 2012/0210233 A1* | 8/2012 | Davis | | G06Q 30/0201 |
| | | | | 715/727 |
| 2012/0215652 A1* | 8/2012 | Melvin | | G06Q 30/06 |
| | | | | 705/26.1 |
| 2012/0215893 A1* | 8/2012 | Bisdikian | | G06F 9/5011 |
| | | | | 709/223 |
| 2012/0311614 A1* | 12/2012 | DeAnna | | H04L 67/10 |
| | | | | 719/328 |
| 2013/0013544 A1* | 1/2013 | Lee | | H04L 67/16 |
| | | | | 706/27 |
| 2013/0095867 A1* | 4/2013 | Kim | | H04W 4/006 |
| | | | | 455/500 |
| 2013/0132566 A1* | 5/2013 | Olsen | | H04W 4/025 |
| | | | | 709/224 |
| 2013/0157718 A1* | 6/2013 | Johanson, III | | H04M 1/66 |
| | | | | 455/556.1 |
| 2013/0159223 A1* | 6/2013 | Bahl | | G01D 1/00 |
| | | | | 706/12 |
| 2013/0237254 A1* | 9/2013 | Papakipos | | G06Q 10/10 |
| | | | | 455/456.3 |
| 2013/0238535 A1* | 9/2013 | Leppanen | | G06N 99/005 |
| | | | | 706/12 |
| 2013/0238700 A1* | 9/2013 | Papakipos et al. | | 709/204 |
| 2013/0260783 A1* | 10/2013 | Agrawal | | H04L 67/12 |
| | | | | 455/456.1 |
| 2013/0261769 A1* | 10/2013 | Hong | | H04W 52/0277 |
| | | | | 700/12 |
| 2013/0330055 A1* | 12/2013 | Zimmermann | | H04N 1/00127 |
| | | | | 386/240 |
| 2014/0024392 A1* | 1/2014 | Su | | H04W 4/025 |
| | | | | 455/456.2 |
| 2014/0053260 A1* | 2/2014 | Gupta | | G06F 21/50 |
| | | | | 726/22 |
| 2014/0068439 A1* | 3/2014 | Lacaze | | G06F 3/04855 |
| | | | | 715/720 |
| 2014/0107493 A1* | 4/2014 | Yuen | | H04W 4/027 |
| | | | | 600/473 |
| 2014/0129162 A1* | 5/2014 | Hallman | | G01R 31/3689 |
| | | | | 702/63 |
| 2014/0187264 A1* | 7/2014 | Min | | H04W 48/16 |
| | | | | 455/456.2 |
| 2014/0212002 A1* | 7/2014 | Curcio | | G06K 9/00744 |
| | | | | 382/107 |
| 2014/0223421 A1* | 8/2014 | Carter | | A61B 5/0022 |
| | | | | 717/168 |
| 2014/0316736 A1* | 10/2014 | Strohbach | | H04L 67/12 |
| | | | | 702/127 |
| 2014/0317734 A1* | 10/2014 | Valencia | | G06F 21/552 |
| | | | | 726/22 |
| 2014/0351337 A1* | 11/2014 | Pal | | G09B 19/06 |
| | | | | 709/204 |
| 2014/0359552 A1* | 12/2014 | Misra | | H04L 67/12 |
| | | | | 717/100 |
| 2014/0372348 A1* | 12/2014 | Lehmann et al. | | 706/12 |
| 2014/0379878 A1* | 12/2014 | Bandyopadhyay | | H04L 67/16 |
| | | | | 709/220 |
| 2015/0039269 A1* | 2/2015 | Mejegard | | G06Q 10/06 |
| | | | | 702/182 |
| 2015/0163720 A1* | 6/2015 | Cordeiro De Oliveria Barros | | H04W 40/20 |
| | | | | 370/254 |
| 2015/0234880 A1* | 8/2015 | Huber | | G06F 17/30345 |
| | | | | 707/609 |
| 2015/0294431 A1* | 10/2015 | Fiorucci | | G06Q 50/26 |
| | | | | 705/13 |
| 2016/0156652 A1* | 6/2016 | Paffenroth | | H04L 63/1425 |
| | | | | 726/23 |

OTHER PUBLICATIONS

Ganti et al., Mobile Crowd Sensing: Current State and Future Challenges, IEEE Communications Magazine, Nov. 2011.
Tamlin et al., Context-Aware Mobile Crowd Sourcing, UbiComp'12, Sep. 8, 2012, Pittsburg, USA.
Ra et al., Medusa: a Programming Framework for Crowd-Sensing Applications, MobiSys'12, Jun. 25-29, 2012, Low Wood Bay, Lake District, UK.
Bao et al., MOVI: Mobile Phone Based Video Highlights via Collaborative Sensing, MobiSys'10, Jun. 15-18, 2010, San Francisco, California, USA.
Shirazi et al., SENSE-SATION: An Extensible Platform for Integration of Phones into the Web. Internet of Things, Nov. 29, 2010-Dec. 1, 2010.

(56) References Cited

OTHER PUBLICATIONS

Aberer et al. Opensense: Open Community Driven Sensing of Environment, in ACM SIGSPATIAL International Workshop on GeoStreaming (IWGS), 2010.

Krause et al., Toward Community Sensing, in IPSN, 2008.

Rana et al., Earphone: an End-to-End Participatory Urban Noise Mapping System, in IPSN, 2010.

Do et al., Contextual Grouping: Discovering Real-Life Interaction Types from Longitudinal Bluetooth Data, in IEEE Mobile Data Management, 2011.

Lane et al., A Survey of Mobile Phone Sensing, in IEEE Communications Magazine, 2010.

Ravindranath et al., Code in the Air: Simplifying Sensing and Coordination Tasks on Smartphones, in ACM Hotmobile, 2012.

Bhattacharya et al., Mist: Distributed Indexing and Querying in Sensor Networks Using Statistical Models, in VLDB, 2007.

Wang et al., Predictive Modeling-Based data Collection in Wireless Sensor Networks, in EWSN, 2008.

Sen et al., The Case for Cloud-Enabled Mobile Sensing Services, in ACM Mobile Cloud Computing (MCC) Workshop (in conjunction with ACM Sigcomm), 2012.

Kang et al., Seemon: Scalable and Energy-Efficient Context Monitoring Framework for Sensor-Rich Mobile Environments, in ACM Mobisys, 2008.

Wang et al., A Framework of Energy Efficient Mobile Sensing for Automatic User State Recognition, in MobiSys, 2009, pp. 179-192.

Lu et al., SoundSense: Scalable Sound Sensing for People-Centric Applications on Mobile Phones, in MobiSys, 2009, pp. 165-178.

Sheng et al., Energy-efficient Collaborative Sensing with Mobile Phones, in IEEE Infocom, 2012.

Nath, Ace: Exploiting Correlation for Energy-Efficient and Continuous Context Sensing, in ACM Mobisys, 2012.

Rachuri et al., Energy-Accuracy Tradeoffs in Querying Sensor Data for Continuous Sensing Mobile Systems, in Proc. of the ACM Workshop on Mobile Context Awareness, Co-located with ACM UbiComp'10, 2010.

\* cited by examiner

FIG. 2

```
<tns:Moment name="Moment1" xmlns:tns="http://www.ibm.com/BlueZen/MomentSchema">
    <tns:Trigger> ... </tns:Trigger>
    <tns:UtilityFunction> ... </tns:UtilityFunction>
    <tns:Callback> ... </tns:Callback>
</tns:Moment>
```

```
<tns:Trigger>
  <tns:Sensor name="GPS">
    <tns:Condition>
      <tns:And>
        <tns:LogicalExpression>
          <tns:Predicate operator="GreaterThan">
            <tns:Operand>
              <tns:Function>
                <tns:Mod>
                  <tns:Operand>
                    <tns:SensorAttribute>x</tns:SensorAttribute>
                  </tns:Operand>
                </tns:Mod>
              </tns:Function>
            </tns:Operand>
            <tns:Operand>
              <tns:Constant>2.3</tns:Constant>
            </tns:Operand>
          </tns:Predicate>
        </tns:LogicalExpression>
        <tns:LogicalExpression>
          ...
        </tns:LogicalExpression>
      </tns:And>
    </tns:Condition>
  </tns:Sensor>
  </tns:Sensor name="Bluetooth">
    ...
  </tns:Sensor>
</tns:Trigger>
```

FIG. 4

```
<tns:UtilityFunction>
    <tns:Utility>
        <tns:TimePeriod>
            <tns:StartTime>09:00:00</tns:StartTime>
            <tns:EndTime>18:00:00</tns:EndTime>
        </tns:TimePeriod>
        <tns:GoeArea>
            <tns:CenterLocation>
                <tns:Latitude>27.5</tns:Latitude>
                <tns:Longitude>27.5</tns:Longitude>
            </tns:CenterLocation>
            <tns:Radius>50</tnd:Radius>
        </tns:GoeArea>
        <tns:Value>0.8</tns:Value>
    </tns:Utility>
</tns:UtilityFunction>
```

FIG. 5

```
<tns:Callback url="http://www.ibm.com/ReportingServlet">
    <tns:SensorInput name="Bluetooth">
        <tns:Attribute>neighbours</tns:Attribute>
    </tns:SensorInput>
    <tns:SensorInput name="GPS">
        <tns:Attribute>x</tns:Attribute>
        <tns:Attribute>y</tns:Attribute>
    </tns:SensorInput>
</tns:Callback>
```

APPLICATION AND SITUATION-AWARE COMMUNITY SENSING

FIELD OF THE INVENTION

Embodiments of the invention generally relate to information technology, and, more particularly, to community-driven sensing techniques.

BACKGROUND

Challenges exist in community-driven sensing, namely in attempts to reduce infrastructure costs for traditional sensor networks. By way of example, crowd-sensing is a mechanism wherein a community is organically involved in sensing a phenomenon or event of interest. The basic blueprint of a crowd-sensing application includes a sensing agent running on a mobile device such as a mobile phone, while a back-end application (for example, a server) aggregates results and provides services. Such applications are commonly referred to as community-oriented applications (CoAs).

Accordingly, there exists interest in exploiting mobile devices as a community of sensors that can be utilized to sense heterogeneous phenomena ranging from sound pollution to urban social dynamics. However, designing mobile device-resident middleware for opportunistic and objective-oriented sensing of these phenomena remains a challenge. Consequently, a need exists for creating a client-side middleware that enables a unified sensing architecture and expressivity constructs to allow for efficient control and coordination of a sensor network by a CoA based on received data.

SUMMARY

In one aspect of the present invention, techniques for application and situation-aware community sensing are provided. An exemplary computer-implemented method can include steps of processing one or more sensor data requirements for each of multiple sensing applications and one or more user preferences for sensing, determining a sensing strategy for multiple sensors corresponding to the multiple sensing applications based on the one or more sensor data requirements and the one or more user preferences for sensing, wherein said sensing strategy comprises logic for executing a sensing task, and scheduling a sensor duty cycle and a sampling frequency for each of the multiple sensors based on the sensing strategy needed to execute the sensing task.

In another aspect of the invention, an exemplary computer-implemented method can include steps of capturing one or more sensor data requirements for each of multiple sensing applications and one or more user preferences for sensing, and processing the one or more sensor data requirements and the one or more user preferences for sensing to determine a sensing strategy for multiple sensors corresponding to the multiple sensing applications, wherein said sensing strategy comprises logic for executing a sensing task. The method also includes scheduling a sensor duty cycle and a sampling frequency for each of the multiple sensors based on the sensing strategy needed to execute the sensing task, and transmitting data sensed by the multiple sensors to a server associated with at least one of the multiple sensing applications.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating an example schema of moment specification, according to an embodiment of the invention;

FIG. 3 is a diagram illustrating an example snippet of a trigger specification, according to an embodiment of the invention;

FIG. 4 is a diagram illustrating an example snippet of a utility specification, according to an embodiment of the invention;

FIG. 5 is a diagram illustrating an example snippet of a callback specification, according to an embodiment of the invention;

DETAILED DESCRIPTION

As described herein, an aspect of the present invention includes application and situation-aware community sensing. At least one embodiment of the invention includes a utility-driven mobile device (for example, a smart-phone) middleware for executing community-driven sensing tasks. As further detailed herein, a mobile device sensing framework in accordance with one or more embodiments of the invention is application-aware (that is, it adapts its operation based on demands of the application), user-aware (that is, it incorporates preferences, policies and/or behavioral history of the user carrying the phone or other mobile device), and situation-aware (that is, it considers resource dynamics on the device at any given point). Additionally, an aspect of the invention includes a unified device middleware to simultaneously execute sensing tasks at moments across multiple applications.

At least one embodiment of the invention includes sensing and propagating events so as to respect user requirements, application demands and resource constraints by balancing such considerations through a unified device middleware on which different sensing applications execute. Also, sensing requirements are modeled as moments, as described herein, and commonalities are explored for sensing and event computation.

Applications specify sensing requirements through a declarative specification through which an application can specify the sensing task and associated spatio-temporal demand values associated with the task. Due to the specification, the commonalities across these requirements are automatically determined to reduce overall sensing by re-using the same sensed data across different applications and also to reduce the computation cost by deciding the level at which moments are evaluated.

Accordingly, an aspect of the invention also includes combining requirements across applications and optimizing execution. By way of example, at least one embodiment of the invention includes facilitating saving sensing costs as compared to duty-cycling that is imposed by multiple parallel and disconnected applications, as well as saving processing costs by exploiting commonalities of execution requirements across applications.

Figure 1:
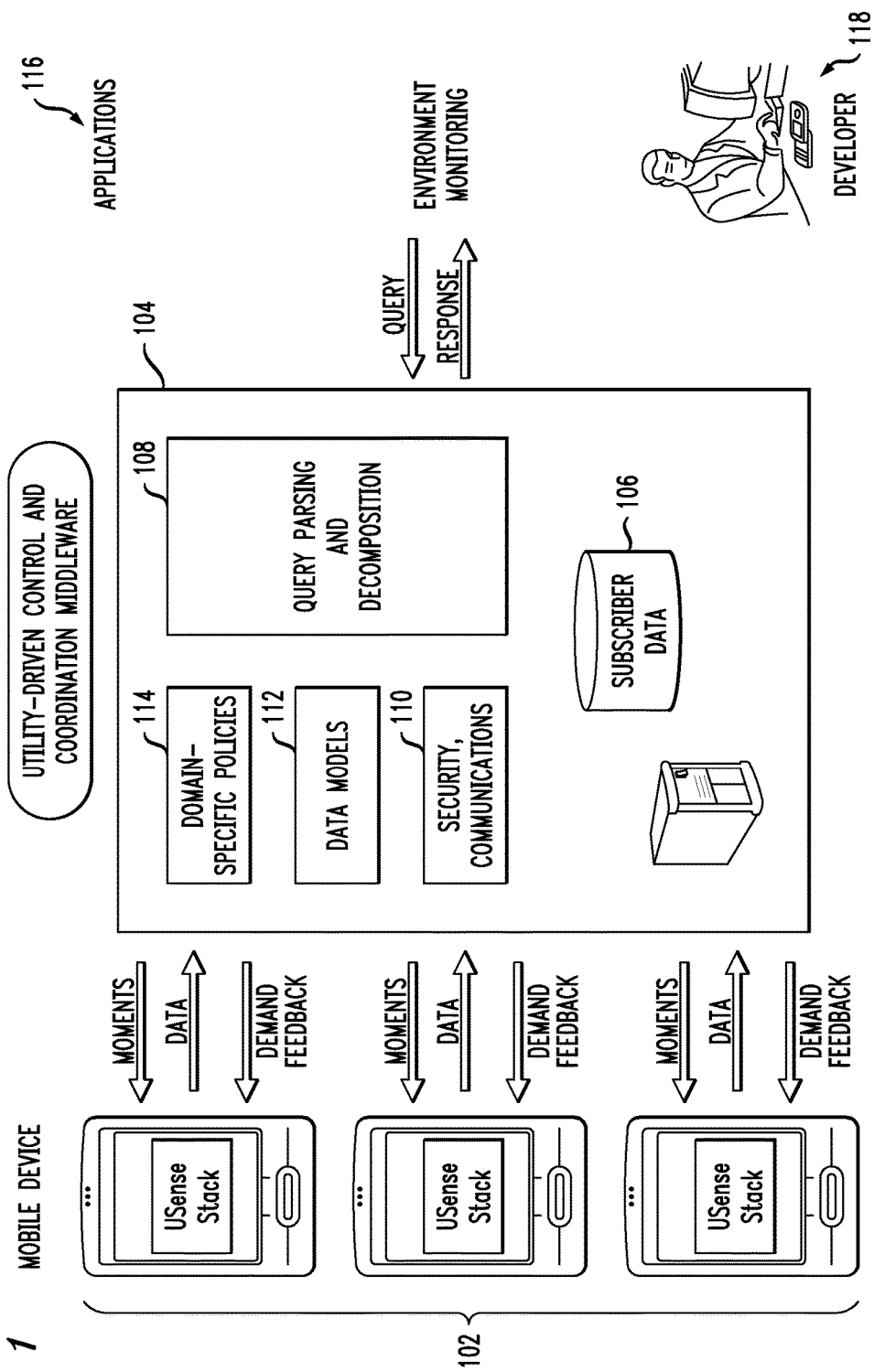
FIG. 1 is a diagram illustrating a platform for development, deployment and execution of community-oriented applications, according to an embodiment of the invention.

FIG. 1 is a diagram illustrating a platform for development, deployment and execution of community-oriented applications, according to an embodiment of the invention. By way of illustration, FIG. 1 depicts mobile devices 102, applications 116 and a developer 118. Additionally, FIG. 1 depicts coordination middleware 104, which includes a subscriber database 106, a query parsing and decomposition component 108, a security and communications component 110, a data model component 112 and a domain-specific policy component 114.

Such a platform as described in connection with one or more embodiments of the invention includes a cloud-based coordination middleware to jointly harness the sensing potential in the mobile devices and harvest the necessary sensor data recorded by the sensors. The players associated with CoAs form an ecosystem that is a producer-consumer ecosystem with controlling stakeholders administering the flow of information between the producers and the consumers based on certain objectives. The producers in a system such as depicted in FIG. 1 are the sensors embedded in the mobile devices 102 of the participating users. The consumers are the CoAs, which provide appropriate services to their users based on the data.

The middleware 104 as depicted in FIG. 1 parses a query (via component 108) and sends out sensing tasks to individual mobile devices 102 (using a specification called moments, as further described herein). The middleware 104 collects data, builds data models (via component 112) and responds to queries. Also, the middleware 104 computes spatio-temporal characteristics of the data demands of CoAs hosted in the platform and provides inputs to clients pertaining to the demand. The clients can consider the input and autonomously decide on sensing policies, depending on other client-specific requirements and constraints (for example, user preferences and resources available). Additionally, the middleware 104 stores domain-specific policies 114 and manages messaging and communications 110 with the mobile end points.

To use middleware, in accordance with at least one embodiment of the present invention, a CoA developer can specify a sensing task using an abstract data type referred to herein as a moment. A moment first specifies the processing requirements using declarative primitives as a computation on top of the sensor data. The computations are typically mathematical operations on a quantized form of the data (for example, quantization of five seconds). A moment can be defined over multiple sensors and can be a combination of pre-defined moments, and frequently used moments can be made readily available to the developers using a library. During application deployment time, moments corresponding to the application are registered with the individual middleware instances residing in the mobile devices. Thereafter, the middleware manages execution of the moments and transmits events back to the CoA. CoAs can periodically update the installed moment specification to register new requirements.

Conceptually, a sensing moment encapsulates the logic to define an event of interest and its associated value to the CoA. Accordingly, in at least one embodiment of the invention, a moment specification includes representation constructs along three dimensions: (i) criteria to ascertain that something of interest has transpired, (ii) data that need to be reported and data routing details, and (iii) spatio-temporal utility of the data as perceived by the CoA so that the overall sensing task can be optimized. Based on these considerations, at least one embodiment of the invention includes a moment specification that contains a trigger to specify the criteria (events of interest) when data are to be reported, a utility function to specify the spatio-temporal utility of the sensing task, and a callback feature to specify the data to be reported and how that data is to be sent.

FIG. 2 is a diagram illustrating an example schema of moment specification 202, according to an embodiment of the invention. As detailed herein, an extensible markup language (XML) schema is used to define the structure and various constructs of the task specification language. Each task specification is thus an XML document conforming to this schema.

Criteria of occurrence for a moment are specified by a CoA developer using a trigger. By way of example, an application can be interested in obtaining data periodically, or when some condition (either based on raw sensor values or involving a higher level function on top of raw values) is evaluated as true. Accordingly, in at least one embodiment of the invention, such a trigger has a schedule construct and a condition construct, either or both of which can be used on a given sensor. A schedule construct, for example, is used for periodic reporting and has a start date and an end date between which the events would be reported, and a duration to specify the periodicity of the event.

An event condition is modeled as a logical expression with Boolean and relational operators applied to operands. The operands can be raw sensor values represented by sensor attributes, or can be a derived value computed from the raw sensor values. At least one embodiment of the invention includes enabling an application developer to declaratively specify the computation procedure on raw sensor values. Another advantage of such a specification is that the same sensing task specification can be used for all mobile operating system (OS) platforms.

FIG. 3 is a diagram illustrating an example snippet of a trigger specification 302, according to an embodiment of the invention. Specifically, FIG. 3 depicts a trigger specification containing an event condition on global positioning system (GPS) and Bluetooth sensors. The events across sensors are defined to be "AND," that is, the overall event is true only when all individual sensor events are true.

Additionally, in at least one embodiment of the invention, moment specification also provides auxiliary occurrence criteria that can be expressed for a trigger having an event condition. Such auxiliary parameters can be organized under categories that include time-based, toggle-based, and/or persistence-based. In the case of time-based, a time period is specified that pertains to the minimum duration between two reports of events (even if the condition is satisfied in-between). For toggle-based, the current "true" evaluation of the condition is reported only if the last evaluation was "false" (for example, to provide an alert only when a user enters or leaves a geographic zone). For the persistence-based criteria, a minimum time period is provided for which the condition has to be continuously true (for example, to report only when a sound level is beyond a threshold for a certain amount of time). Depending on the requirement, one or more of these parameters can be used to further qualify a moment occurrence.

A sensing task may have different utility than an application based on the time of day and/or the location of a user. For example, a CoA interested in monitoring noise in a city might not need readings in areas where it (that is, the CoA) already has sufficient data for modeling or if the phenomenon is relatively invariant. Similarly, a CoA might only be interested in monitoring the sound levels in a city during evening time. Hence, the middleware of one or more embodiments of the invention includes not activating (or de-activating) sensors at certain times to save on energy and/or computing resources of a mobile device.

At least one embodiment of the invention includes modeling the CoA's utility criteria through a utility function construct that is a collection of utility elements. Each utility element contains a utility value between 0 and 1, as well as the associated time period, user location or both. Accordingly, each utility element can serve to capture the CoA's perceived utility at different times of day and/or at various geographical locations. By way of example, a time period can be represented as a start and end time for which that utility value is valid, and a geographical location can be represented as any closed geographical region modeled as a set of points (in order) which are connected.

FIG. 4 is a diagram illustrating an example snippet of a utility specification 402, according to an embodiment of the invention. Specifically, FIG. 4 depicts a utility function specification where the utility of sensed data is 0.8 between 9:00 AM to 6:00 PM, and only when the user is within 50 kilometers (km) of the specified center location. At any other time, or if the user is outside the specified region, the utility of sensed data is 0. As is to be appreciated, the particular physical interpretation of a given utility value on the 0-1 scale can be based, for example, on a contract between the CoA developer and the specific middleware instance realization.

In at least one embodiment of the invention, a CoA specifies which sensor values are reported back when an event occurs. For example, an application might be interested in the location (for example, GPS coordinates) when the sound decibel level crosses a particular threshold. Further, the manner by which such values are to be routed to the corresponding CoA can also be specified. In at least one embodiment of the invention, this information is captured through a callback element, which includes a uniform resource identifier (URI) attribute that provides the uniform resource locator (URL) where the sensed information is to be reported.

FIG. 5 is a diagram illustrating an example snippet of a callback specification 502, according to an embodiment of the invention. In accordance with the example depicted in FIG. 5, various reporting models can be implemented. The information to be passed is specified by one or more sensor input elements, which each have an attribute name that gives the name of the sensor and one or more attribute elements that give the actual information to be reported. The example in FIG. 5 depicts how to specify latitude and longitude values of a GPS sensor.

Figure 6:
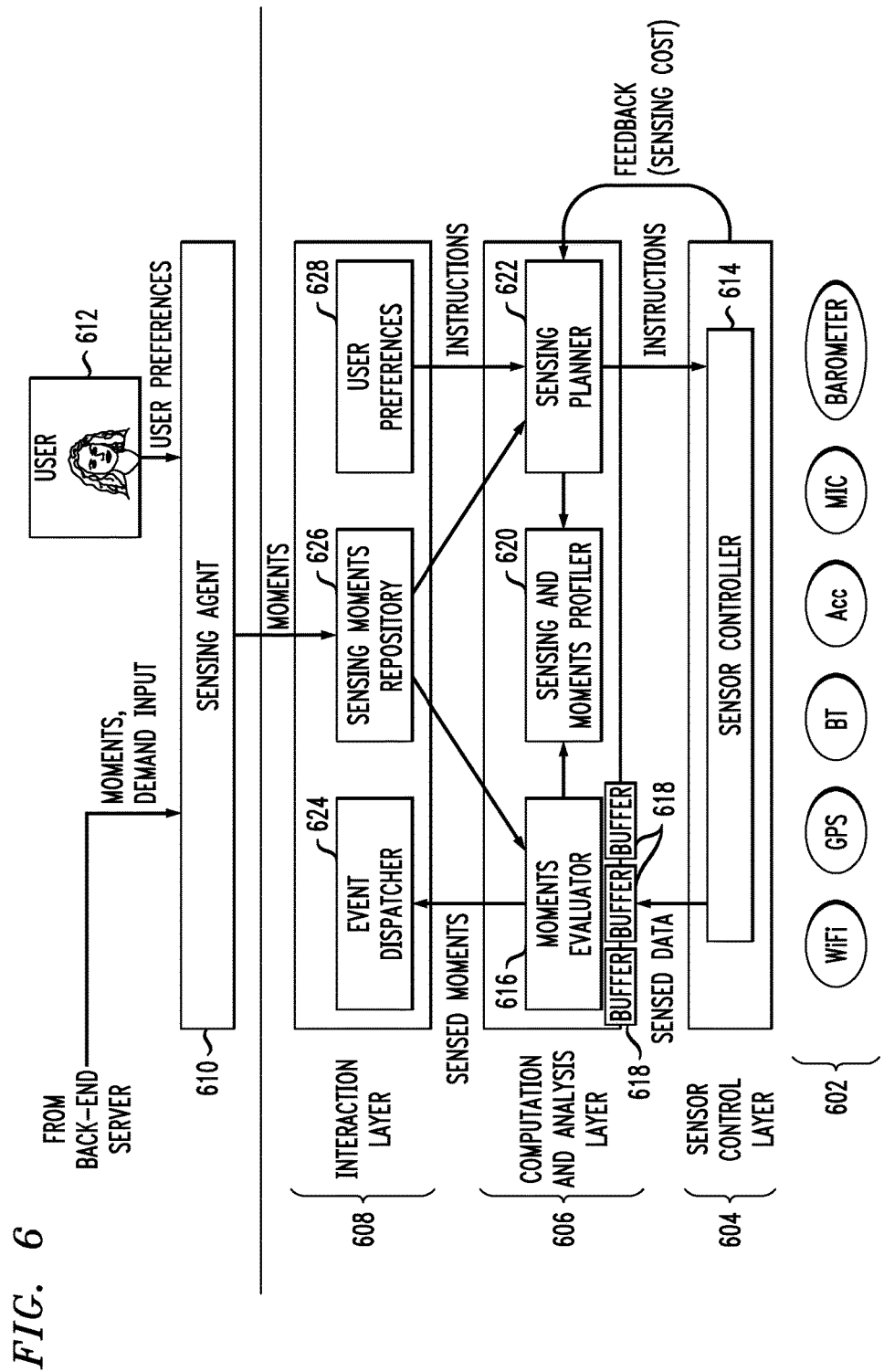
FIG. 6 is a block diagram illustrating an example embodiment, according to an aspect of the invention.

FIG. 6 is a block diagram illustrating an example embodiment, according to an aspect of the invention. Specifically, FIG. 6 illustrates the layered architecture of the middleware, as described herein. As depicted in the figure, the sensing agent 610 is a client-side application that can be deployed by each CoA. The sensing agent 610 interacts with the back-end application server of the CoA to receive the moment specification, and sends back the appropriate data sensed by middleware to the back-end server. Further, preferences (privacy restrictions, battery budget allowed, etc.) of the user 612 are captured and fed into the middleware via the sensing agent 610.

With respect to CoAs, each CoA is assumed to be running on a server-side platform that aggregates results from multiple participants and executes several application-specific control instructions on the data (for example, tasking, communications and collaborations). Additionally, each participating mobile device user 612 has a common device-side client that enables the user and his or her mobile device (for example, a smart-phone) to participate and collaborate in the CoA. A device client is an application (app) that can, for example, be downloaded onto the user's device. Also, when a user subscribes to a new CoA, the policies for participation of the device are downloaded and configured on the client, and a device-side application proxy stores app-specific instructions and communicates with the common device-side client. Thereafter, the common device agent manages the communication and sensing tasks while being sensitive to the user's usage profile on the device, the demands from the back-end applications, the user's perceived value of participation, and energy usage.

Referring back to FIG. 6, the middleware includes an interaction layer 608, a computation and analysis layer 606, and a sensor control layer 604. As described herein, the interaction layer 608 includes specifications of an application's requirements (what to sense, and when), user preferences, as well as rules that specify how to extract rich presence/semantics from raw sensor data. Additionally, the computation and analysis layer 606 evaluates registered requirements against available sensor data, learns a user's sensor data history, and determines a sensing strategy. Further, the sensor control layer 604, via sensor controller component 614, controls access to sensors (at a hardware level), implements a sensing strategy, and transmits data to a utility layer.

The interaction layer 608 reads in the sensor data requirements for the CoAs and the user preferences for sensing, and passes such information to the underlying computation and analysis layer 606 for data obtainment from the sensors. Within the interaction layer, 608, the user preference module 628 stores the policies specified by the users. The user preferences are used as constraints by the underlying layers to determine a sensing plan. For example, a user may want to specify that the sensing activity should be reduced when the battery level of the device falls below 50%, and all sensing be stopped if the battery level is less than 20%. In another example, a user may wish to stop any sensing activity between 9:00 AM and 5:00 PM, or if the user is physically located at his or her office.

For CoAs, user preferences can be classified into categories such as time-based, location-based, and resource-based user preferences. For time-based criteria, the user can specify different time periods for which the sensing activity should be stopped (or started). The criteria can be modeled, by way of example, as a collection of different time periods, with each period having a start time and an end time. For location-based criteria, the user can specify a location (such as an office location) as a circular region in terms of latitude and longitude where sensing should be disabled (or enabled). For resource-based criteria, a user can specify, for example, different device battery levels for different sensing behavior. For instance, at a battery level below a user-specified threshold, the sensing activity can be stopped completely or certain sensors restricted from being invoked. Another resource is the mobile device's data connection, and a user could specify, for example, which connection (for example, Wi-Fi) should be used for data upload.

As also within the interaction layer 608, the sensing moment repository 626 collects a list of moments received from the sensing agent 610 and stores the moments along with the corresponding binding or callback information before passing the moments to the computation and analysis layer 606. The repository 626 may also store other bookkeeping information related to the moments. The event dispatcher module 624 is an engine that makes use of the callback information and dispatches the relevant data corresponding to an occurrence of a moment.

The computation and analysis layer 606 is responsible for devising efficient management policies for executing the moments. The moments transmitted by the interaction layer 608 are used by a moment evaluator module 616 and a sensing planner module 622. The moment evaluator module 616 implements the logic required to compute occurrences of the moments. The logic of a moment can be rule-based and/or learning-based. Rule-based evaluations extract attributes specified during the application development time. Learning-based evaluations correspond to the events that are evaluated with pre-built machine learning tools.

Because such computations need a window of data sensed over a certain period of time, the moment evaluator module 616 maintains a buffer 618 for each of the sensors. The buffers 618 are (continuously) populated with data sensed by the underlying sensor control layer 604. The size of a buffer 618 depends on the logic implemented by the moment evaluator module 616 and, hence, is a programmable parameter for the middleware. The sensing moment repository 626 reuses the common moment computations among the various CoAs, and saves compute and storage resources in the middleware.

Also, as further described herein, moment evaluation time, value and a timestamp can be obtained to build moment profiles, and raw sensor data received from lower modules can be obtained to build sensor profiles via module 620.

With respect to evaluating moments, at least one embodiment of the invention includes expressing moments using conjunctive normal form (CNF). All moment rules are merged together to build a common hierarchical structure for evaluating rules, and a quantitative margin of tolerance value is assigned for each attribute in a moment. This provides a quantitative estimate (time) of the amount of relaxation the rule can assume while evaluating stale data.

Each application can specify a tolerance limit criteria in the moment definition. By way of example, a tolerance limit may specify how stale the rest of a particular item of data, on which the evaluation of the moment is dependent, can become. At least one embodiment of the invention defines limits including sensor-specific limits and moment-specific limits. Sensor specific limits may specify, for example how stale GPS data can be when any other dependent data have arrived. Moment-specific limits may specify how stale any set of data can be when any other dependent data have arrived. As noted above, the moment evaluator module 616 has a buffer 618 for each sensor which holds the most recent value received from that sensor.

The sensing planner module 622 provides intelligence for the sensing strategy or policy of the sensors. A sensing strategy of a sensor specifies whether a particular instance of time and space is suitable for sensing data from the sensor. The efficiency of the strategy is measured by an objective function that takes into account the demand of the data item at an instance of time and space, obtained through moment specification updates from the back-end server (application-awareness), after discounting the associated cost for sensing in terms of resources consumed (situation-awareness) and the constraints imposed by the users owning the sensors (user-awareness). That is, the sensing planner module 622 can consider information such as the current set of moments, profile/history of sensor data and moment occurrences, user preferences and sensing costs in determining the desired duty cycle of the sensors.

Additionally, the sensing planner module 622 implements an appropriate sensing strategy that optimizes the objective function. Because of the inherent uncertainty associated with unbounded data sensed from the physical world, the optimization of such objective functions is a computationally hard problem and various heuristic-based solutions can be implemented. At least one embodiment of the invention includes analyzing historical data for previously observed trends and bounds and using such data to reduce the uncertainty.

The sensor and moment profiler module 620 stores such historical data for the sensing planner module 622 to use. Historical data can be stored, for example, as a time series of moment evaluation results or as a time series of raw sensor data depending on the storage available to the sensor and moment profiler module 620. As detailed further herein, the sensing planner module 622 makes use of parameters that include sampling frequency and duty cycle, as exposed by the underlying sensor control layer 604, to implement a sensing strategy.

The sensor control layer 604 acts as an interface to the sensor hardware 602 (which can include Wi-Fi, GPS, etc.) and schedules the sensor duty cycle and sampling frequency for a sensor according to the sensor strategy devised by the sensing planner module 622. Duty cycle refers to the ratio between the time period for which a sensor is turned OFF (that is, not actively sensing) and the time period for which the sensor is turned ON (that is, actively sensing). The sampling frequency for a sensor refers to the frequency at which data are sensed when the sensor is ON. Low-level platform-specific application programming interfaces (APIs) for various sensors are used to program a sensor with the required sampling frequency and duty cycle.

The sensor control layer 604 also exposes higher-level APIs to the computation and analysis layer 606 for that layer to specify the desired duty cycle and sampling frequency for a sensor. The APIs can be on-demand or periodic in nature. Additionally, the sensor control layer 604 is also responsible for sending the data recorded by the sensors 602 to the buffers 618 of the moment evaluator module 616 for evaluation of the relevant moments. Further, the sensor control layer 604 also reports the associated cost of invocation to the computation and analysis layer 606. This information (in addition to other information) is used by the sensing planner module 622 to periodically determine or update an appropriate sensing strategy.

Figure 7:
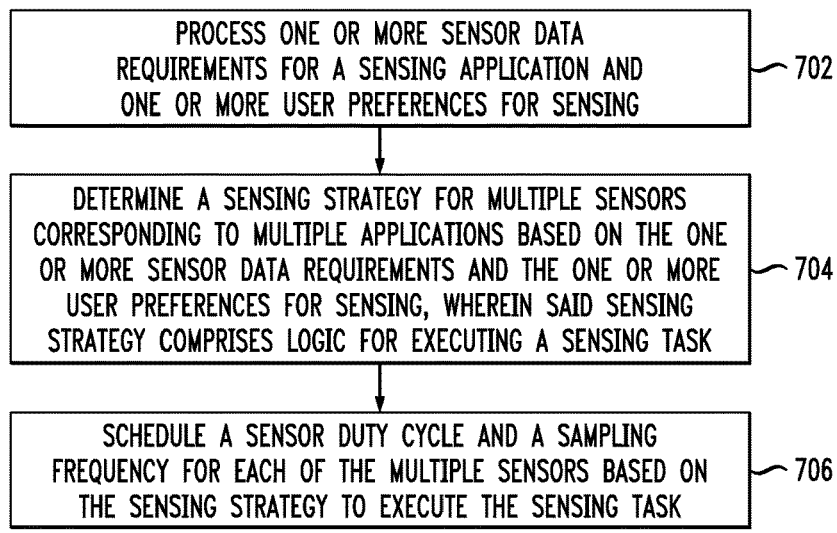
FIG. 7 is a flow diagram illustrating techniques according to an embodiment of the invention.

FIG. 7 is a flow diagram illustrating techniques according to an embodiment of the present invention. Step 702 includes processing one or more sensor data requirements for each of multiple sensing applications and one or more user preferences for sensing. The sensor data requirements can include sensed event criteria, a spatio-temporal utility function for an event to be sensed, and/or specifications for reporting sensor information. Additionally, the user preferences can include a time-based preference, a location-based preference, and/or a resource-based preference.

Step 704 includes determining a sensing strategy for multiple sensors (for example, GPS, Bluetooth, etc.) corresponding to the multiple sensing applications (CoAs) based on the one or more sensor data requirements and the one or more user preferences for sensing, wherein said sensing strategy comprises logic for executing a sensing task. Determining can include evaluating the sensor data requirements against available sensor data, as well as learning sensor data history for the user and/or one or more different applications. Additionally, a sensing strategy specifies a period of time and/or a geographic location suitable for a sensor to actively sense data. Further, as detailed herein, a sensing strategy reduces resource consumption while satisfying one or more user preferences and one or more application requirements.

Step 706 includes scheduling a sensor duty cycle and a sampling frequency for each of the multiple sensors based on the sensing strategy needed to execute the sensing task. As detailed herein, a sensor duty cycle includes a ratio between a time period for which a sensor is not actively sensing and a time period for which the sensor is actively sensing. Also, a sampling frequency comprises a frequency at which data are sensed when a sensor is actively sensing.

The techniques depicted in FIG. 7 can also include storing the sensor data requirements for the sensing application and the user preferences for sensing. Further, at least one embodiment of the invention includes maintaining a buffer for each of the multiple sensors, wherein each buffer is continuously populated with data sensed by the corresponding sensor.

Figure 8:
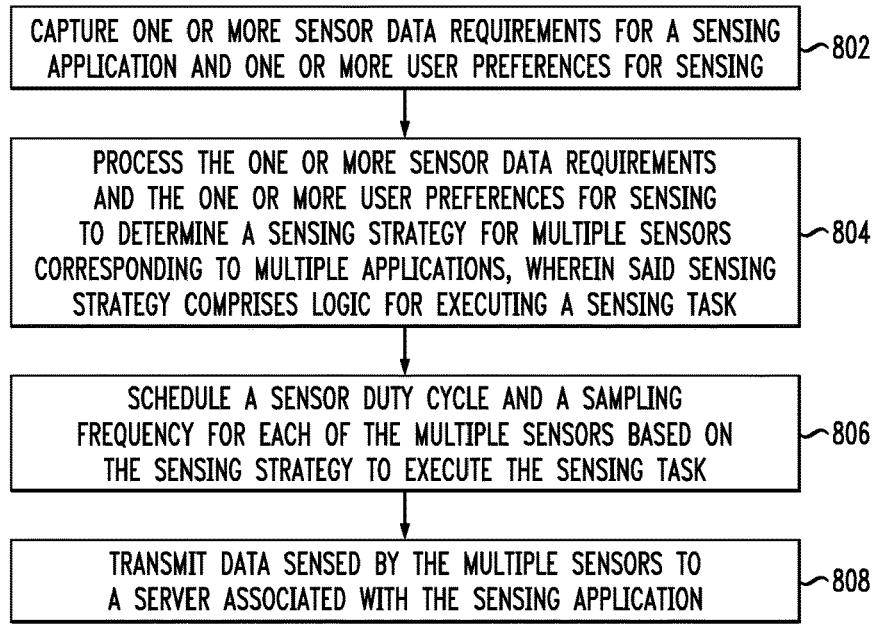
FIG. 8 is a flow diagram illustrating techniques according to an embodiment of the invention.

FIG. 8 is a flow diagram illustrating techniques according to an embodiment of the invention. Step 802 includes capturing one or more sensor data requirements for each of multiple sensing applications and one or more user preferences for sensing. Step 804 includes processing the one or more sensor data requirements and the one or more user preferences for sensing to determine a sensing strategy for multiple sensors (for example, GPS, Bluetooth, etc.) corresponding to the multiple sensing applications (CoAs), wherein said sensing strategy comprises logic for executing a sensing task.

Step 806 includes scheduling a sensor duty cycle and a sampling frequency for each of the multiple sensors based on the sensing strategy needed to execute the sensing task. Step 808 includes transmitting data sensed by the multiple sensors to a server associated with at least one of the multiple sensing applications.

The techniques depicted in FIG. 7 and FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 and FIG. 8 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 9:
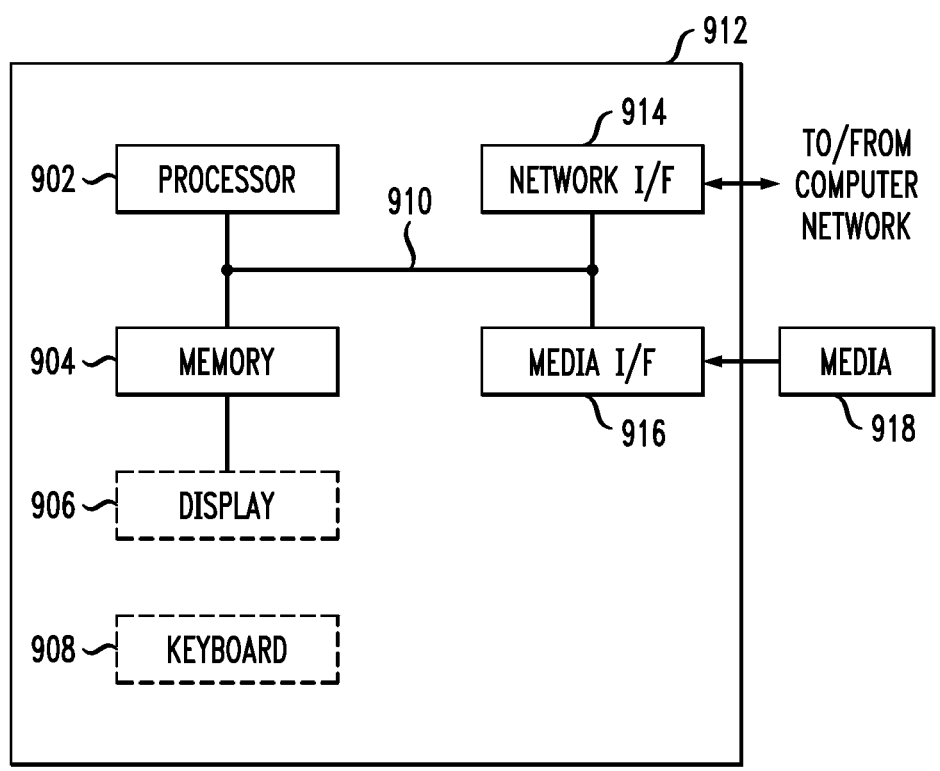
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, sensing and propagating events so as to respect user requirements, application demands and resource constraints by balancing such considerations through a unified device middleware on which different sensing applications execute.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising steps of:
    implementing middleware to process:
        (i) one or more sensor data requirements for each of multiple sensing applications, each associated with a given mobile device that is attributed to a given one of multiple users, wherein the one or more sensor data requirements comprise:
        at least a spatio-temporal utility function for an event to be sensed, wherein the spatio-temporal utility function comprises multiple utility elements, and wherein the multiple utility elements capture a perceived utility value, estimated by the multiple sensing applications, of sensing the event (a) at multiple different times of day and (b) at multiple different geographic locations;
        automatically determining multiple instances of the same sensed data across the multiple sensing applications; and
        reusing one of the multiple instances in connection with two or more of the multiple sensing applications,
        (ii) user preferences for sensing in connection with the given mobile device, wherein the user preferences comprise: (a) reducing sensing activity when a battery level of the given mobile device falls below a user-specified battery capacity percentage; (b) stopping sensing activity when a battery level of the given mobile device falls below a user-specified battery capacity percentage; (c) multiple time periods, each with a user-specified start time and a user-specified stop time, during which sensing activity via the given mobile device is permitted; (d) one or more locations specified by latitude and longitude values wherein sensing activity via the given mobile device is permitted; (e) one or more locations specified by latitude and longitude values wherein sensing activity via the given mobile device is prohibited; and (f) a user-specified data connection to be used via the given mobile device for one or more data upload actions carried out in connection with sensing activity; and
        (iii) resource dynamics on the given device at a given time;
    receiving a sensing query;
    parsing the received sensing query into multiple sensing tasks;
    determining, via the middleware, a community-sensing strategy across the multiple users in response to the sensing query via use of multiple sensors, each embedded in a distinct one of the mobile devices and corresponding to a distinct one of the multiple sensing applications, wherein said community-sensing strategy is based on (i) the sensor data requirements (ii) the user preferences for sensing and (iii) the resource dynamics on the given device, wherein said determining the sensing strategy comprises generating logic via the middleware for executing the multiple sensing tasks; and
    scheduling, via the middleware, a sensor duty cycle and a sampling frequency for each of the multiple sensors based on the sensing strategy needed to execute the multiple sensing tasks, wherein said scheduling comprises outputting instructions pertaining to one or more of the multiple sensing tasks to each of the mobile devices, wherein said instructions specify (i) a period of time during which the given mobile device is to actively sense data and (ii) a geographic location at which the given mobile device is to actively sense data; wherein said steps are carried out by at least one computer device.

2. The method of claim 1, wherein the one or more sensor data requirements comprise sensed event criteria.

3. The method of claim 1, wherein the one or more sensor data requirements comprise one or more specifications for reporting sensor information.

4. The method of claim 1, wherein said sensing strategy reduces resource consumption while satisfying the user preferences and the one or more application requirements.

5. The method of claim 1, wherein said determining comprises evaluating the one or more sensor data requirements against available sensor data.

6. The method of claim 1, wherein said determining comprises learning sensor data history for the user and/or one or more different sensing applications.

7. The method of claim 1, comprising:
storing the one or more sensor data requirements for each sensing application and the user preferences for sensing.

8. The method of claim 1, comprising:
maintaining a buffer for each of the multiple sensors, wherein each buffer is continuously populated with data sensed by the corresponding sensor.

9. The method of claim 1, wherein the sensing is specified by a moment, wherein said moment comprises a trigger to specify one or more criteria under which data are to be reported, and wherein said spatio-temporal utility function comprises a combination of one or more pre-defined moments and one or more frequently used moments.

10. An article of manufacture comprising a non-transitory computer readable storage medium having computer readable instructions tangibly embodied thereon which, when implemented, cause a computer to carry out a plurality of method steps comprising:
implementing middleware to process:
(i) one or more sensor data requirements for each of multiple sensing applications, each associated with a given mobile device that is attributed to a given one of multiple users, wherein the one or more sensor data requirements comprise:
at least a spatio-temporal utility function for an event to be sensed, wherein the spatio-temporal utility function comprises multiple utility elements, and wherein the multiple utility elements capture a perceived utility value, estimated by the multiple sensing applications, of sensing the event (a) at multiple different times of day and (b) at multiple different geographic locations;
automatically determining multiple instances of the same sensed data across the multiple sensing applications; and
reusing one of the multiple instances in connection with two or more of the multiple sensing applications,
(ii) user preferences for sensing in connection with the given mobile device, wherein the user preferences comprise: (a) reducing sensing activity when a battery level of the given mobile device falls below a user-specified battery capacity percentage; (b) stopping sensing activity when a battery level of the given mobile device falls below a user-specified battery capacity percentage; (c) multiple time periods, each with a user-specified start time and a user-specified stop time, during which sensing activity via the given mobile device is permitted; (d) one or more locations specified by latitude and longitude values wherein sensing activity via the given mobile device is permitted; (e) one or more locations specified by latitude and longitude values wherein sensing activity via the given mobile device is prohibited; and (f) a user-specified data connection to be used via the given mobile device for one or more data upload actions carried out in connection with sensing activity; and
(iii) resource dynamics on the given device at a given time;
receiving a sensing query;
parsing the received sensing query into multiple sensing tasks;
determining, via the middleware, a community-sensing strategy across the multiple users in response to the sensing query via use of multiple sensors, each embedded in a distinct one of the mobile devices and corresponding to a distinct one of the multiple sensing applications, wherein said community-sensing strategy is based on (i) the sensor data requirements (ii) the user preferences for sensing and (iii) the resource dynamics on the given device, wherein said determining the sensing strategy comprises generating logic via the middleware for executing the multiple sensing tasks; and
scheduling, via the middleware, a sensor duty cycle and a sampling frequency for each of the multiple sensors based on the sensing strategy needed to execute the multiple sensing tasks, wherein said scheduling comprises outputting instructions pertaining to one or more of the multiple sensing tasks to each of the mobile devices, wherein said instructions specify (i) a period of time during which the given mobile device is to actively sense data and (ii) a geographic location at which the given mobile device is to actively sense data.

11. The article of manufacture of claim 10, wherein said sensing comprise utilizing multiple user mobile devices.

12. A system comprising:
a memory; and
at least one processor coupled to the memory and operative for:
implementing middleware to process:
(i) one or more sensor data requirements for each of multiple sensing applications, each associated with a given mobile device that is attributed to a given one of multiple users, wherein the one or more sensor data requirements comprise:
at least a spatio-temporal utility function for an event to be sensed, wherein the spatio-temporal utility function comprises multiple utility elements, and wherein the multiple utility elements capture a perceived utility value, estimated by the multiple sensing applications, of sensing the event (a) at multiple different times of day and (b) at multiple different geographic locations;
automatically determining multiple instances of the same sensed data across the multiple sensing applications; and
reusing one of the multiple instances in connection with two or more of the multiple sensing applications;
(ii) user preferences for sensing in connection with the given mobile device, wherein the user preferences comprise: (a) reducing sensing activity when a battery level of the given mobile device falls below a user-specified battery capacity percentage; (b) stopping sensing activity when a battery level of the given mobile device falls below a user-specified battery capacity percentage; (c) multiple time periods, each with a user-specified start time and a user-specified stop time, during which sensing activity via the given mobile device is permitted; (d) one or more locations specified by latitude and longitude values wherein sensing activity via the given mobile device is permitted; (e) one or more locations specified by latitude and longitude values wherein sensing activity via the given mobile device is prohibited; and (f) a user-specified data connection to be used via the given mobile device for one or more data upload actions carried out in connection with sensing activity; and (iii) resource dynamics on the given device at a given time;

receiving a sensing query;

parsing the received sensing query into multiple sensing tasks;

determining, via the middleware, a community-sensing strategy across the multiple users in response to the sensing query via use of multiple sensors, each embedded in a distinct one of the mobile devices and corresponding to a distinct one of the multiple sensing applications, wherein said community-sensing strategy is based on (i) the sensor data requirements (ii) the user preferences for sensing and (iii) the resource dynamics on the given device, wherein said determining the sensing strategy comprises generating logic via the middleware for executing the multiple sensing tasks; and scheduling, via the middleware, a sensor duty cycle and a sampling frequency for each of the multiple sensors based on the sensing strategy needed to execute the multiple sensing tasks, wherein said scheduling comprises outputting instructions pertaining to one or more of the multiple sensing tasks to each of the mobile devices, wherein said instructions specify (i) a period of time during which the given mobile device is to actively sense data and (ii) a geographic location at which the given mobile device is to actively sense data.

13. The system of claim 12, wherein said sensing strategy reduces resource consumption while satisfying the user preferences and the one or more application requirements.

14. A method comprising steps of:

capturing:

(i) one or more sensor data requirements for each of multiple sensing applications, each associated with a given mobile device that is attributed to a given one of multiple users, wherein the one or more sensor data requirements comprise:

at least a spatio-temporal utility function for an event to be sensed, wherein the spatio-temporal utility function comprises multiple utility elements, and wherein the multiple utility elements capture a perceived utility value, estimated by the multiple sensing applications, of sensing the event (a) at multiple different times of day and (b) at multiple different geographic locations;

automatically determining multiple instances of the same sensed data across the multiple sensing applications; and reusing one of the multiple instances in connection with two or more of the multiple sensing applications;

(ii) user preferences for sensing in connection with the given mobile device, wherein the user preferences comprise: (a) reducing sensing activity when a battery level of the given mobile device falls below a user-specified battery capacity percentage; (b) stopping sensing activity when a battery level of the given mobile device falls below a user-specified battery capacity percentage; (c) multiple time periods, each with a user-specified start time and a user-specified stop time, during which sensing activity via the given mobile device is permitted; (d) one or more locations specified by latitude and longitude values wherein sensing activity via the given mobile device is permitted; (e) one or more locations specified by latitude and longitude values wherein sensing activity via the given mobile device is prohibited; and (f) a user-specified data connection to be used via the given mobile device for one or more data upload actions carried out in connection with sensing activity; and (iii) resource dynamics on the given device at a given time;

receiving a sensing query;

parsing the received sensing query into multiple sensing tasks;

implementing middleware to process (i) the one or more sensor data requirements (ii) the user preferences for sensing and (iii) the resource dynamics on the given device to determine a community-sensing strategy across the multiple users in response to the sensing query via use of multiple sensors, each embedded in a distinct one of the mobile devices and corresponding to a distinct one of the multiple sensing applications, wherein said determining the sensing strategy comprises generating logic via the middleware for executing the multiple sensing tasks;

scheduling, via the middleware, a sensor duty cycle and a sampling frequency for each of the multiple sensors based on the sensing strategy needed to execute the multiple sensing tasks, wherein said scheduling comprises outputting instructions pertaining to one or more of the multiple sensing tasks to each of the mobile devices, wherein said instructions specify (i) a period of time during which the given mobile device is to actively sense data and (ii) a geographic location at which the given mobile device is to actively sense data; and transmitting data sensed by the multiple sensors to a server associated with at least one of the multiple sensing applications;

wherein the steps are carried out by at least one computer device.

15. The method of claim 14, wherein said sensing comprise utilizing multiple user mobile devices.

16. The method of claim 14, wherein the sensing is specified by a moment, wherein said moment comprises a trigger to specify one or more criteria under which data are to be reported, and wherein said spatio-temporal utility function comprises a combination of one or more pre-defined moments and one or more frequently used moments.

* * * * *